United States Patent [19]

Yamamoto et al.

[11] Patent Number: 5,750,183
[45] Date of Patent: May 12, 1998

[54] PROCESS FOR PRODUCING PROTEINACEOUS MICROPARTICLES

[75] Inventors: Norio Yamamoto; Yoshihiro Yamamoto, both of Itami; Tetsuo Nunome, Kawanishi; Koutarou Muroyama, Itami; Hiroaki Kusaka, Takarazuka, all of Japan

[73] Assignees: Takeda Food Products, Ltd.; Miki Trading Co., Ltd., both of Osaka, Japan

[21] Appl. No.: 341,899

[22] Filed: Nov. 15, 1994

[30] Foreign Application Priority Data

Nov. 16, 1993 [JP] Japan .................. 5-286552

[51] Int. Cl.$^6$ .................. A23J 1/20
[52] U.S. Cl. .................. 426/656; 426/41; 426/425; 426/583; 426/657; 426/804
[58] Field of Search .................. 426/656, 657, 426/583, 425, 41, 34, 39, 804

[56] References Cited

U.S. PATENT DOCUMENTS

| | | | |
|---|---|---|---|
| 4,143,174 | 3/1979 | Shah et al. | 426/570 |
| 4,209,503 | 6/1980 | Shah et al. | 424/49 |
| 4,214,009 | 7/1980 | Chang | 426/558 |
| 4,215,040 | 7/1980 | Hager | 260/123.5 |
| 4,219,469 | 8/1980 | Kadan et al. | 260/123.5 |
| 4,528,203 | 7/1985 | Harris et al. | 426/555 |
| 4,734,287 | 3/1988 | Singer et al. | 426/41 |
| 4,956,193 | 9/1990 | Cain et al. | 426/573 |
| 4,961,953 | 10/1990 | Singer et al. | 426/656 |
| 5,080,921 | 1/1992 | Reimer | 426/564 |
| 5,145,702 | 9/1992 | Stark et al. | 426/531 |
| 5,219,602 | 6/1993 | Saleeb et al. | 426/250 |
| 5,232,722 | 8/1993 | Obara et al. | 426/104 |
| 5,330,778 | 7/1994 | Stark et al. | 426/531 |
| 5,350,590 | 9/1994 | McCarthy et al. | 426/549 |

FOREIGN PATENT DOCUMENTS

| | | | |
|---|---|---|---|
| 0 400 714 | 12/1990 | European Pat. Off. | A23J 3/04 |
| 0 412 590 | 2/1991 | European Pat. Off. | A23J 1/20 |
| 4-228036 | 8/1992 | Japan | A23J 3/08 |
| 4-267850 | 9/1992 | Japan | A23J 3/08 |
| WO 89/05098 | 6/1989 | WIPO | A23J 1/20 |
| WO 89/05587 | 6/1989 | WIPO | A23G 9/00 |
| WO 90/03123 | 4/1990 | WIPO | A23Y 3/00 |
| WO 91/17665 | 11/1991 | WIPO | A23C 21/00 |

OTHER PUBLICATIONS

Morr et al. "Preparation and Properties of an Alcohol-Precipitated Whey Protein Concentrate" 1970 pp. 1162-1170.

*Primary Examiner*—Lien Tran
*Attorney, Agent, or Firm*—Jacobson, Price, Holman & Stern, PLLC

[57] ABSTRACT

A process for producing proteinaceous microparticles by lowering a pH of a liquid mixture which contains a whey protein together with a metal element by using an acid, removing insoluble materials, raising the pH, and mixing the liquid mixture with an hydrophilic organic solvent. The microparticles are useful as a fat substitute containing no fat.

6 Claims, 1 Drawing Sheet

PROCESS FOR PRODUCING PROTEINACEOUS MICROPARTICLES

FIELD OF THE INVENTION

The present invention relates to proteinaceous microparticles useful as a fat substitute containing no fat, and to the production thereof.

BACKGROUND OF THE INVENTION

Whey proteins are a kind of milk protein and composed of lactalbumin, lactoglobulin, etc., and they denature by heating at 72° to 75° C. Utilization of whey proteins for foods has been studied in view of their properties, such as solubility, emulsifiability, gelling ability, etc. Recently, it has been proposed to use whey proteins particularly for textured substances as fat substitutes.

Fat substitutes using proteins are roughly divided into gel compositions and emulsion-like compositions. Most of the emulsion-like compositions using whey proteins known so far are in the form of microparticles produced by heating for denaturation or using high shearing force. Singer et al. discloses denatured protein microparticles for fat substitutes prepared from whey proteins (JP-A 63-24857, U.S. Pat. No. 4,734,287). These microparticles are giant colloids of spherical particles formed by heating a whey protein aqueous solution under high shearing conditions. U.S. Pat. No. 4,143,174 discloses use of colloidal precipitates obtained from a whey solution for foods. These are non-proteinaceous colloidal insoluble precipitates formed by heating and raising pH of a concentrated permeate fraction of ultra-filtration of whey. For producing proteinaceous microparticles without heating for denaturation, there is a method wherein hydrophobic proteins dissolved in an organic solvent are dispersed in an aqueous solution (JP-A 4-502102, U.S. Pat. No. 246,435). However, because whey proteins are soluble in water, whey proteins cannot be used for this method. Examples of emulsion-like fat substitutes using insoluble salts are microparticles of titanium oxide, microparticles of calcium citrate (JP-A 5-260906, U.S. Pat. No. 5,219,602), etc. However, these salts cannot be completely substituted for fat nor used in foods in a large amount because they provide a rough feel and an astringent taste.

As described above, to form fat substitutes providing an emulsion-like texture by using a whey protein solution, methods wherein proteinaceous microparticles are formed by denaturation by heating under high shearing conditions have often been used. However, most of the proteinaceous microparticles obtained by these methods have rather cream-like properties, and few of them have solid oil and fat-like properties.

Techniques to produce foods by denaturing proteins are well known. In general, denaturing proteins means partially changing the structure of protein molecules so as to change their shapes. During the denaturation of proteins, the deformation, association and aggregation of the protein molecules occur and result in the formation of aggregates. Such association and aggregation are caused by intermolecular bonds of hydrophobic bonds, hydrogen bonds, ionic bonds, etc. It is difficult to understand the relationships among them to expect specific properties of the proteins.

OBJECTS OF THE INVENTION

The main object of the present invention is to provide proteinaceous microparticles useful as a fat substitute containing no fat.

Another object of the present invention is to provide a process for producing proteinaceous microparticles useful as a fat substitute containing no fat.

These objects as well as other objects and advantages of the present invention will become apparent to those skilled in the art from the following description with reference to the accompanying drawings.

SUMMARY OF THE INVENTION

The present inventors have intensively studied to achieve the above objects, and surprisingly found that proteinaceous microparticles can be obtained, without heating or high shearing force, by lowering a pH of a liquid mixture which contains a whey protein and a metal element by using an acid, removing insoluble materials, raising the pH, and mixing the liquid mixture with a hydrophilic organic solvent. Furthermore, it has also been found that the proteinaceous microparticles have solid oil and fat-like properties (e.g., smooth and glossy), and that they are useful as fat substitutes.

The present invention provides proteinaceous microparticles obtainable by:

lowering pH of a liquid mixture which contains a whey protein together with a metal element by using an acid;

removing insoluble materials;

increasing the pH; and mixing the liquid mixture with a hydrophilic organic solvent.

The present invention also provides a process for producing proteinaceous microparticles which comprises:

lowering pH of a liquid mixture which contains a whey protein together with a metal element by using an acid;

removing insoluble materials;

raising the pH; and mixing the liquid mixture with a hydrophilic organic solvent.

The present invention also provides proteinaceous microparticles obtained by the above process.

DETAILED DESCRIPTION OF THE INVENTION

Figure 1:
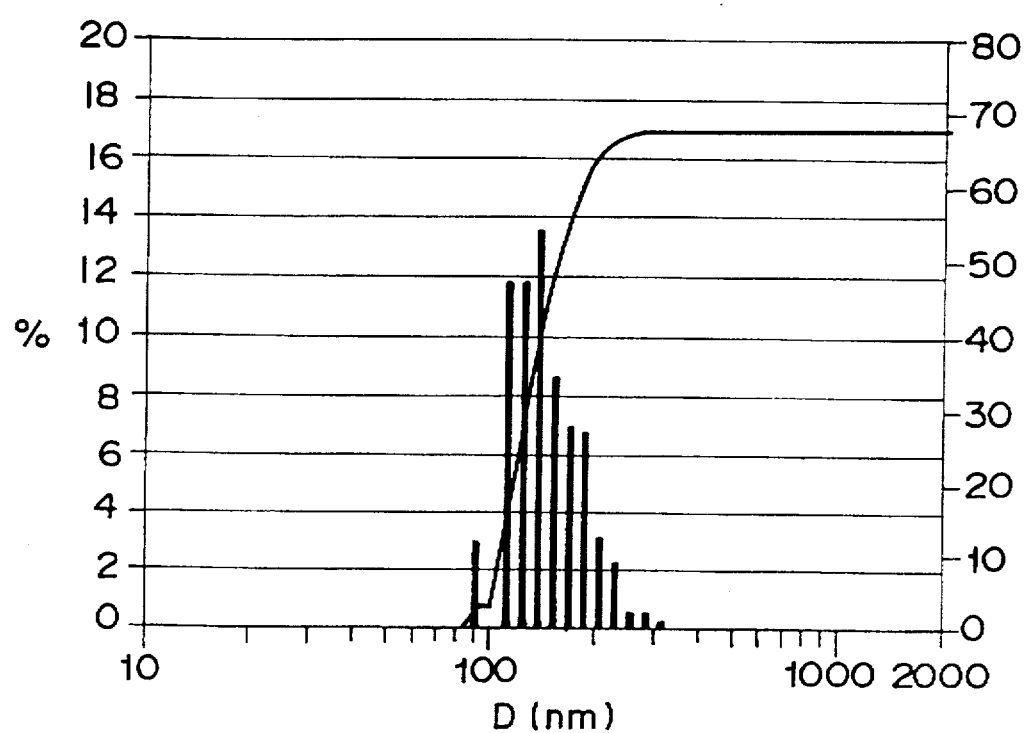
FIG. 1 is a semilogarithmic histogram showing the particle size distribution on the weight basis of the proteinaceous microparticles obtained in Example 7. The numbers on the abscissa indicate the particle size, and the numbers on the ordinate indicate the relative frequency and the cumulative frequency thereof.

The liquid mixture which contains a whey protein together with a metal element (hereinafter sometimes referred to as the whey protein-containing liquid mixture, or simply as the liquid mixture) to be used in the present invention means a liquid, such as solution, suspension and emulsion, etc., containing a whey protein and a metal element. The whey protein-containing liquid mixture is preferably in the form of an aqueous solution, an aqueous suspension or an aqueous emulsion, more preferably in the form of an aqueous solution.

As the whey protein, there can be used whey proteins per se, such as commercially available whey protein concentrates, whey protein isolates, etc., and conventional whey protein-containing dairy products, such as raw milk, skim milk, skim milk powder, etc. In particular, whey protein concentrates, whey protein isolates, skim milk and skim milk powder are preferred.

When the protein content in the whey protein-containing liquid mixture is high, protein aggregates are formed, and the paste separated by centrifugation, etc., contains rough particles and provides a rough feel. High shearing force can be used to avoid this problem, but the present invention avoids this problem by simply decreasing the whey protein concentration. In view of this, the protein concentration in the whey protein-containing liquid mixture to be used in the present invention is normally 0.05 to 10% by weight, preferably 0.1 to 5% by weight, based on the liquid mixture. Because the whey protein concentration in actual milk is within the above range, whey obtained by treating skim milk with an acid to remove casein (such whey is hereinafter sometimes referred to as acid whey) can be used as it is as the whey protein without controlling the protein concentration. Many processes for producing proteinaceous microparticles using whey proteins require concentration of the whey proteins. On the other hand, the acid whey in the present invention can be used even after further diluting it. That is, the acid whey obtained during the production of caseinate can be used without concentration by ultrafiltration, etc., or desalting.

The metal element contained in the above whey protein-containing liquid mixture is not specifically limited as long as it can be used in foods. Examples of the metal element include sodium, potassium, magnesium, calcium, iron, zinc, etc. In particular, bivalent metals are preferred, and calcium is more preferred. These metal elements in the present invention include those in any possible forms, such as free ions in the whey protein-containing liquid mixture, metal elements incorporated into proteins. The metal element concentration in the whey protein-containing liquid mixture is 0.6 mmol to 1.5 mol, preferably 1.5 mmol to 1.5 mol, per g of the whey protein.

Such metal elements may be derived from added metal salts. In particular, when whey protein concentrates, whey protein isolates, etc., are used as the whey proteins, metal salts are normally added to a liquid containing such whey proteins. Examples of the metal salts include sodium salts (e.g., sodium chloride, sodium sulfate, sodium nitrate, sodium phosphate, etc.), potassium salts (e.g., potassium chloride, potassium sulfate, potassium nitrate, potassium phosphate, etc.), magnesium salts (e.g., magnesium chloride, magnesium sulfate, etc.), calcium salts (e.g., calcium phosphate, calcium lactate, calcium chloride, calcium citrate, etc.), iron salts (e.g., iron chloride, iron sulfate, etc.), zinc salts (e.g., zinc chloride, zinc sulfate, etc.), etc.

The above metal elements may be derived from added natural mineral materials. Natural mineral materials such as milk serum minerals, (e.g., milk serum calcium, etc.), bovine bone powder, etc., may be added instead of the above metal salts or together with the above metal salts. Among the above metal salts or natural mineral materials, those containing a bivalent metal are preferred. More preferred are the metal salts or natural mineral materials containing calcium (e.g., calcium phosphate, calcium lactate, milk serum calcium, etc.). When those containing calcium are used, the resulting proteinaceous microparticles contain calcium in a high concentration. Thus, the microparticles of the present invention provide an additional advantage of calcium enhancement (i.e., increasing the calcium content) in addition to fat substitution. Some calcium salts are insoluble in neutral pH regions, but the calcium salts are dissolved by acids in the present invention.

Raw milk, skim milk or skim milk powder contains metal elements derived from natural sources. Therefore, when they are used in the present invention, metal salts or natural mineral materials need not be added. However, if necessary, the above metal salts or natural mineral materials can be added.

The proteinaceous microparticles of the present invention can normally be prepared, without heating, by lowering the pH of the whey protein-containing liquid mixture by using an acid, removing insoluble materials, and then raising the pH. That is, firstly, the whey protein-containing liquid mixture is normally adjusted to pH 6 or less, preferably pH 3 to 5, and insoluble materials, such as casein, in the liquid mixture with such a low pH are removed. The acid to be used is not specifically limited as long as it can be used in foods. Examples of the acid include inorganic acids such, as hydrochloric acid, sulfuric acid, phosphoric acid, etc.; organic acids such, as lactic acid, acetic acid, etc. The resulting insoluble materials can be removed by conventional separating methods, such as centrifugation, filtration, etc. Then, the resulting liquid is adjusted to pH 6 to 9, preferably about 7, with a base. The base to be used is not specifically limited as long as it can be used in foods. Examples of the base include alkaline metal hydroxides, such as sodium hydroxide, potassium hydroxide, etc.

Further, the liquid mixture with an increased pH is mixed with a hydrophilic organic solvent to precipitate proteinaceous microparticles in the liquid mixture. Examples of the hydrophilic organic solvent to be used include monohydric or polyhydric alcohols (e.g., methanol, ethanol, propanol, butanol, ethylene glycol, glycerin, etc.), ethers (e.g., tetrahydrofuran, dioxane, etc.), and nitriles (e.g., acetonitrile, etc.). In particular, monohydric or polyhydric alcohol having 1 to 5 carbon atoms are preferred. Since the proteinaceous microparticles of the present invention are used in foods, solvents used in foods such, as ethanol are preferred. The amount of the hydrophilic organic solvent to be used is at least 0.3 times (v/v), preferably 0.3 to 5 times (v/v), more preferably 0.5 to 2 times (v/v), that of the whey protein-containing liquid mixture. Because the precipitated proteinaceous microparticles contain the hydrophilic organic solvent, if necessary, the hydrophilic organic solvent can be removed or its concentration can be decreased. The removal or decrease in the concentration of the hydrophilic organic solvent can be carried out by conventional separating methods, such as washing with water followed by centrifugation and filtration.

As described above, instead of lowering the pH of the whey protein-containing liquid mixture by using an acid and removing insoluble materials, acid whey can be used. That is, the pH of skim milk is decreased using the above acid, and insoluble materials such, as casein, are removed as described above. In this case, the contamination of some casein causes no problem, and the pH may be not more than 6, preferably 3 to 5. Then, the solution after removing casein (acid whey) is adjusted to pH 6 to 9, preferably pH about 7, and then mixed with a hydrophilic organic solvent to precipitate proteinaceous microparticles.

After the pH of the whey protein-containing liquid mixture is decreased by using an acid and the insoluble materials are removed, raising the pH sometimes forms additional insoluble materials. In this case, the resulting insoluble materials may be separated to remove them by conventional methods, such as centrifugation, filtration, etc., and then the supernatant is mixed with a hydrophilic organic solvent to form proteinaceous microparticles. Unless the insoluble materials formed by raising the pH have much effects on properties, etc., of the proteinaceous microparticles, this suspension of the insoluble materials can be mixed with a hydrophilic organic solvent to form proteinaceous microparticles. For example, when 2-fold diluted acid whey is used, the insoluble materials formed by raising the pH are hardly produced. Therefore, immediately after raising the pH of the diluted acid whey, the acid whey can be mixed with a hydrophilic organic solvent to precipitate the proteinaceous microparticles. The paste of the proteinaceous microparticles obtained by the above method has solid oil and fat-like properties (e.g., smooth and glossy).

The proteinaceous microparticles of the present invention are a paste obtained by centrifugation at 7,000 g for 20 minutes, and its solid content is 10 to 50% by weight. The ash and protein contents are 20 to 60% by weight and 10 to 80% by weight on dry bases, respectively. Their particle size is 0.01 to 1 µm, preferably less than 0.5 µm in terms of an average particle size. The proteinaceous microparticles of the present invention are characterized by higher ash contents than those of conventional fat substitutes using whey proteins. The high ash contents participate in the properties of the proteinaceous microparticles of the present invention. When calcium salts are used, the proteinaceous microparticles contain calcium/proteins in a ratio of 0.2–2. When calcium salts are used, the proteinaceous microparticles contain much calcium, and an additional advantage of calcium enhancement is obtained.

Because the proteinaceous microparticles of the present invention have high ash contents, the particles are suitably hard. Therefore, compared to other fat substitutes using proteinaceous microparticles, the proteinaceous microparticles of the present invention have properties closer to those of solid fats and oils, for example, they are more smooth and have higher grinding stress. Furthermore, since they have no rough feel and no astringent taste as compared to fat substitutes using microparticles of insoluble salts, they can completely be substituted with fats and used in a large amount.

The proteinaceous microparticles of the present invention are useful as a fat substitute containing no fat or cholesterol. They can be used in foods, such as margarine, butter, fat spread, various drinks, salad dressing, mayonnaise-type flavorings containing low fat or no fat. They can be used as it is or as conventional dosage forms such as powder prepared by freeze-drying or spray-drying, etc., or granules.

According to the present invention, there are provided proteinaceous microparticles useful as a fat substitute containing no fat. Unlike conventional proteinaceous microparticles, the proteinaceous microparticles of the present invention can be obtained without heating or high shearing force, and they have high ash contents and solid oils and fats-like properties (e.g., smooth and glossy). Furthermore, they provide an additional advantage of calcium enhancement (i.e., increasing calcium contents in foods, etc.).

The following examples further illustrate the present invention in detail but are not to be construed to limit the scope thereof.

EXAMPLE 1

A 10% (by weight) aqueous solution of skim milk powder was adjusted to pH 4.6 with hydrochloric acid and centrifuged at 7,000 g for 15 minutes to remove casein. The resulting acid whey was adjusted to pH 7 with sodium hydroxide aqueous solution. The resulting insoluble materials were removed by centrifugation at 7,000 g for 15 minutes. Then, the supernatant after the centrifugation was mixed with the same volume of ethanol. The resulting proteinaceous microparticles were separated by centrifugation at 7,000 g for 15 minutes. Because the proteinaceous microparticles thus obtained contained ethanol in a high concentration, a 3-fold (v/v) amount of ion-exchange water was added to reduce the ethanol content. The mixture was stirred to give a dispersion, and the dispersion was centrifuged at 7,000 g for 15 minutes to separate proteinaceous microparticles. The proteinaceous microparticles were obtained as an almost transparent white composition having solid oil and fat-like properties.

EXAMPLE 2

A 10% (by weight) aqueous solution of skim milk powder was adjusted to pH 4.6 with hydrochloric acid and centrifuged at 7,000 g for 15 minutes to remove casein. Calcium lactate was added to the resulting acid whey to a final concentration of 7.0% by weight and dissolved in it with stirring. The solution was adjusted to pH 7 with an aqueous solution of sodium hydroxide, and then mixed with the same volume of ethanol. The resulting proteinaceous microparticles was separated by centrifugation at 7,000 g for 15 minutes. Because the proteinaceous microparticles thus obtained contained a large amount of ethanol, they were dispersed in 3-fold (v/v) amount of ion-exchange water to reduce the ethanol content, and separated by centrifugation at 7,000 g for 15 minutes. The proteinaceous microparticles were obtained as an almost transparent white composition having solid oil and fat-like properties.

EXAMPLE 3

A 10% (by weight) aqueous solution of skim milk powder was adjusted to pH 4.6 with hydrochloric acid and centrifuged at 7,000 g for 15 minutes to remove casein. The resulting acid whey was adjusted to pH 7 with an aqueous solution of sodium hydroxide to give a suspension of proteinaceous microparticles. The suspension was mixed with the same volume of ethanol. The resulting proteinaceous microparticles was separated by centrifugation at 7,000 g for 15 minutes. Because the product thus obtained contained ethanol in a high concentration, 3-fold (v/v) amount of ion-exchange water was added to reduce the ethanol content. The mixture was stirred to give a dispersion, and then the dispersion was centrifuged at 7,000 g for 15 minutes to separate proteinaceous microparticles. The proteinaceous microparticles were obtained as an almost transparent white composition having solid oil and fat-like properties.

EXAMPLE 4

A whey protein concentrate (WPC; manufactured by Leprino, U.S.A.; proteins: 81% by weight) was dissolved in ion exchange water to give a 0.4% (by weight) solution of WPC. Milk serum mineral (Kyodo Nyugyo, Japan; NEP-20) was added to a final concentration of 3.0% by weight. The resulting solution was adjusted to pH 3 with hydrochloric acid, centrifuged to remove insoluble materials, and then adjusted to pH 7 with an aqueous solution of sodium hydroxide. The solution was mixed with the same volume of ethanol. The resulting proteinaceous microparticles was separated by centrifugation. Because the proteinaceous microparticles thus separated contained ethanol in a high concentration, they were dispersed in 3-fold (v/v) amount of ion-exchange water to reduce the ethanol content, and separated by centrifugation. The proteinaceous microparticles were obtained as a white composition having fat-like properties.

EXAMPLE 5

WPC was dissolved in ion exchange water to give a 0.4% (by weight) solution of WPC. Calcium lactate was added to a final concentration of 1.3% by weight. The resulting solution was adjusted to pH 4.6 with phosphoric acid, centrifuged to remove insoluble fractions, and then adjusted to pH 7.0 with an aqueous solution of sodium hydroxide. The solution was mixed with the same volume of ethanol. The resulting proteinaceous microparticles was separated by centrifugation. Because the proteinaceous microparticles thus obtained contained ethanol in a high concentration, they were suspended in 3-fold (v/v) amount of ion-exchange water to reduce the ethanol content, and separated by centrifugation. The proteinaceous microparticles were obtained as a white composition having fat-like properties.

EXAMPLE 6

A whey protein isolate (WPI; MLA, manufactured by Meiji, Japan; proteins: 97% by weight) was dissolved in ion exchange water to give a 0.78% (by weight) solution of WPI. Calcium tertiary phosphate was added to a final concentration of 0.25% by weight. The resulting solution was adjusted to pH 3.3 with lactic acid, and filtered to remove insoluble fractions. The filtrate was adjusted to pH 7.0 with an aqueous solution of sodium hydroxide. The resulting insoluble materials were removed by centrifugation. Then, the supernatant was mixed with the same volume of ethanol. The resulting proteinaceous microparticles was separated by centrifugation. Because the proteinaceous microparticles thus obtained contained ethanol in a high concentration, they were suspended in 3-fold (v/v) amount of ion-exchange water to reduce the ethanol content, and separated by centrifugation. The proteinaceous microparticles were obtained as a white composition having fat-like properties.

EXAMPLE 7

Skim milk was serilized by heating at 95° C. for 15 minutes and diluted 2-fold with water, adjusted to pH 4.6 with hydrochloric acid, and centrifuged at 7,000 g for 15 minutes to remove casein. The resulting acid whey was adjusted to pH 7 with an aqueous solution of sodium hydroxide. The resulting insoluble materials were removed by centrifugation at 7,000 for 15 minutes. Then, the supernatant after centrifugation was mixed with the same volume of ethanol. The resulting proteinaceous microparticles were separated by centrifugation at 7,000 g for 15 minutes. Because the proteinaceous microparticles thus obtained contained ethanol in a high concentration, 3-fold (v/v) amount of ion-exchange water was added to reduce the ethanol content. The mixture was stirred to give a dispersion, and then the dispersion was centrifuged at 7,000 g for 15 minutes to separate proteinaceous microparticles. The proteinaceous microparticles were obtained as an almost transparent white composition having solid oil and fat-like properties.

The particle size distribution of the proteinaceous microparticles thus obtained was determined with an electrophoretic light scattering photometer (ELS-800, manufactured by Otsuka Electronics, Japan). For this particle size analysis, a small amount of a paste of the proteinaceous microparticles was suspended in water and dispersed by ultrasonic treatment. Then, this dispersion was diluted to a concentration suitable for the analysis, and the analysis was carried out. The results are in FIG. 1. FIG. 1 is a semilogarithmic histogram showing the particle size distribution on the weight basis as obtained above.

EXAMPLE 8

The proteinaceous microparticles were subjected to spray-drying to give powder. That is, water and maltitol (Mabit; Hayashibara Trading Co., Japan) were added to the paste of the proteinaceous microparticles obtained in Example 7. The ratio of water: maltitol: paste was 1.5:0.05:1 by weight. The mixture was mixed well to prepare a dispersion. This dispersion was spray-dried in a mobile miner type spray dryer (Nilo Co.) at an inlet temperature of 85° C. and an outlet temperature of 50° C. The powder thus obtained was white and had fluidity. Addition of water to the powder readily gave the same fat-like paste as before the drying.

What is claimed is:

1. A process for producing proteinaceous microparticles which comprises:

lowering pH of a liquid mixture, which contains a whey protein together with a metal element, to a pH of from 3 to 5 by using an acid;

removing insoluble material formed by the pH lowering from the liquid mixture; raising the pH of the liquid mixture after the removal of the insoluble material to a pH of from 6 to 9; and mixing the resulting liquid mixture after the raising of the pH with a hydrophilic organic solvent to precipitate proteinaceous microparticles in the liquid mixture.

2. A process according to claim 1, which is carried out without heating.

3. A process according to claim 1, wherein the protein concentration in the liquid mixture is 0.05 to 10% by weight based on the liquid mixture.

4. A process according to claim 1 wherein:

the metal element is a member selected from the group consisting of sodium, potassium, magnesium, calcium, iron and zinc;

the acid is a member selected from the group consisting of hydrochloric acid, sulfuric acid, lactic acid, acetic acid and phosphoric acid;

protein concentration in the liquid mixture is from 0.05 to 10 percent by weight based on the weight of the liquid mixture; and the hydrophilic organic solvent is a monohydric or polyhydric alcohol having from 1 to 5 carbon atoms and is in an amount of not less than 0.3 times (v/v) based on the amount of the liquid mixture.

5. A process for producing proteinaceous microparticles which comprises:

removing insoluble material from a liquid mixture of protein of acid whey and a metal element having a pH of from 3 to 5;

raising the pH of the liquid mixture after the removal of the insoluble material to a pH within the range of from 6 to 9; and mixing the resulting liquid mixture after the raising of the pH with a hydrophilic organic solvent to precipitate proteinaceous microparticles in the liquid mixture.

6. A process according to claim 5, wherein concentration of protein in the acid whey is 0.05 to 10% by weight based on the acid whey.

* * * * *